United States Patent
El-Mankabady et al.

(10) Patent No.: US 10,339,097 B2
(45) Date of Patent: Jul. 2, 2019

(54) HISTORY ARCHIVE OF LIVE AUDIO AND METHODS OF USING THE SAME

(71) Applicant: SIEMENS INDUSTRY, INC., Alpharetta, GA (US)

(72) Inventors: Emad El-Mankabady, Monroe Township, NJ (US); Daniel S. Iasso, Towaco, NJ (US); Robert Limlaw, Boonton, NJ (US); Lester K. Perlak, Westfield, NJ (US); George E. Baker, Cedar Grove, NJ (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 713 days.

(21) Appl. No.: 14/868,881

(22) Filed: Sep. 29, 2015

(65) Prior Publication Data

US 2017/0091200 A1  Mar. 30, 2017

(51) Int. Cl.
| | |
|---|---|
| *G06F 7/00* | (2006.01) |
| *G06F 17/00* | (2019.01) |
| *G06F 16/11* | (2019.01) |
| *G06F 16/61* | (2019.01) |
| *G08B 3/10* | (2006.01) |
| *G08B 21/02* | (2006.01) |
| *G08B 25/00* | (2006.01) |
| *G08B 25/14* | (2006.01) |

(52) U.S. Cl.
CPC ............ *G06F 16/113* (2019.01); *G06F 16/61* (2019.01); *G08B 3/10* (2013.01); *G08B 21/02* (2013.01); *G08B 25/009* (2013.01); *G08B 25/14* (2013.01)

(58) Field of Classification Search
CPC ..................... G06F 17/30073; G06F 17/30778

USPC .......................................................... 707/672
See application file for complete search history.

(56) References Cited

U.S. PATENT DOCUMENTS

| | | | |
|---|---|---|---|
| 4,652,859 A | | 3/1987 | Van Wienen |
| 4,665,544 A | * | 5/1987 | Honda ............... G08B 13/1418 |
| | | | 379/102.03 |
| 6,052,052 A | | 4/2000 | Delmonaco |
| 6,081,758 A | * | 6/2000 | Parvulescu ............ B60K 28/14 |
| | | | 280/735 |

(Continued)

FOREIGN PATENT DOCUMENTS

CA     2775261 A1   10/2013

OTHER PUBLICATIONS

PCT International Search Report and Written Opinion dated Dec. 7, 2016 corresponding to PCT Application No. PCT/US2016/052435 filed Sep. 19, 2016.

*Primary Examiner* — Binh V Ho

(57) ABSTRACT

Systems and methods for archiving data, e.g., log files with live audio, corresponding to an emergency event is provided. Upon an occurrence of a safety event, a notification device, e.g., a smoke detector, detects smoke, and transmits an alert to a fire control panel (FACP). Upon receiving the alert, the FACP generates a log file with data corresponding to the devices responsive to the event. Additionally, a live audio file corresponding to the event is generated, via the FACP or other device. The FACP may then connect to a data controller, via a gateway application, for transmitting the log file and audio file for archiving the same. An audio message of the audio file may then be embedded, via an embedding means, into the log file.

17 Claims, 7 Drawing Sheets

(56) References Cited

U.S. PATENT DOCUMENTS

| | | | | |
|---|---|---|---|---|
| 6,144,310 A * | 11/2000 | Morris | G08B 21/12 340/505 |
| 2005/0231349 A1 * | 10/2005 | Bhat | G08B 3/10 340/506 |
| 2006/0156333 A1 * | 7/2006 | Kendall | G08B 27/008 725/33 |
| 2007/0118851 A1 * | 5/2007 | Yun | G08B 25/004 725/33 |
| 2008/0313006 A1 * | 12/2008 | Witter | G06Q 10/063118 705/7.17 |
| 2010/0019899 A1 * | 1/2010 | Zhang | G08B 27/005 340/540 |
| 2010/0094636 A1 * | 4/2010 | Becker | G08B 25/14 704/273 |
| 2011/0136463 A1 * | 6/2011 | Ebdon | G01C 21/20 455/404.1 |
| 2011/0238135 A1 * | 9/2011 | Marnfeldt | A61N 1/32 607/59 |
| 2012/0154157 A1 * | 6/2012 | George | G08B 21/02 340/584 |
| 2012/0166479 A1 | 6/2012 | Cleghorn et al. | |
| 2012/0139718 A1 | 7/2012 | Foisy et al. | |
| 2012/0286946 A1 * | 11/2012 | Karl | G08B 29/126 340/516 |
| 2013/0250844 A1 * | 9/2013 | Lee | H04W 4/06 370/312 |
| 2014/0253326 A1 * | 9/2014 | Cho | G08B 25/10 340/539.13 |
| 2014/0320282 A1 * | 10/2014 | Zhang | G08B 7/066 340/502 |
| 2014/0340222 A1 * | 11/2014 | Thornton | G08B 7/062 340/539.17 |
| 2015/0116133 A1 * | 4/2015 | Mawbey | G08G 1/092 340/902 |
| 2015/0222239 A1 * | 8/2015 | Zhang | H03G 3/20 381/61 |
| 2016/0088093 A1 * | 3/2016 | Yung | H04L 67/145 709/227 |

* cited by examiner

| Safety Device S/N | Location | Status | Address | Message |
|---|---|---|---|---|
| 1. 234KXSD1 | 84N.54W | Active | 23841 | |
| 2. 234KXSD2 | 83N.3W | Active | 23842 | |
| 3. 234KXSD3 | 82N.52W | Inactive | . . . . . | . . . . |
| 4. 234KXSD4 | 80N.67W | Active | 23844 | Receiving... |
| 5. . . . . . . . . . . . . . . | | | | |

FACP S/N: CP234KX3

| | 284 | | | 281 |
|---|---|---|---|---|
| Date: 01JAN2016 | | | | Log file no.: CP234KX3-01JAN |
| 272a | 272b | | 272c | 283 |
| FACP S/N | Safety Device(s) and Status | Mobile Device S/N | Location | Audio |
| 1. CP234KX3 | SD234KX3 - Activated | SG6XD1 | 84N.54W | 01JANCP234KX3.wav |
| 2. | SD234KX4 - Detected condition | | 84N.53W | 01JANCP234KX3.wav |
| 3. | [Unknown] - Activated | | 84N.55W | 01JANCP234KX3.wav |

FIG. 4B

| | 284 | | | 281 |
|---|---|---|---|---|
| Date: 01JAN2016 | Updated: 08FEB2016 | | | Log file no.: CP234KX3-01JAN |
| 272a | 272b | | 272c | 283 |
| FACP S/N | Safety Device(s) and Status | Mobile Device S/N | Location | Audio |
| 1. CP234KX3 | SD234KX3 - Activated | SG6XD1 | 84N.54W | 01JANCP234KX3.wav |
| 2. | SD234KX4 - Detected condition | | 84N.53W | 01JANCP234KX3.wav |
| 3. | SD234KZ3 - Activated | | 84N.55W | 01JANCP234KX3.wav |
| 4. | SD234KZ9 - Activated | | 84N.56W | 01JANCP234KX3.wav |

US 10,339,097 B2

HISTORY ARCHIVE OF LIVE AUDIO AND METHODS OF USING THE SAME

TECHNICAL FIELD

The present disclosure relates generally to the field of emergency notification systems, and more particularly, to providing a historical archive of live audio corresponding to emergency events detected by the emergency notification system.

BACKGROUND

Typical fire safety systems include a number of safety field devices. For example, devices in a fire safety system may include fire and smoke detectors, pull stations, notification appliances or the like, positioned throughout an infrastructure for detecting an emergency event and notifying individuals of the emergency event. Safety devices are generally monitored and managed via a controller such as, for example, a fire alarm control panel (FACP). The FACP may receive from the safety devices information related to device status, location, and other information related to the respective devices. Upon the occurrence of an emergency event (e.g., a fire), the operator/administrator is typically notified by one or more alarms/alerts from the safety devices via the FACP. Thereafter, the operator may use a microphone of the FACP to broadcast an audio message pertaining to the emergency event to those who may be affected. A historical log file of the event may also be created in response to the emergency event. The log file may typically include the FACP's interactions with the other system devices in response to the emergency event, e.g., which devices were activated, and what occurred thereafter. The log file, however, does not include any broadcasted messages, i.e., the audio related to the occurring event. Having the broadcasted messages included with the log file may prove useful, e.g., should a further investigation into the emergency event be needed. Therefore, there remains a need for systems and methods for archiving the live audio with the log.

SUMMARY

Various disclosed embodiments relate to systems and methods that may be employed in an emergency notification system for embedding audio messages broadcasted in response to an emergency event into a corresponding log file.

In one embodiment, a fire control panel with embedding and archiving capabilities is provided. The fire control panel may include a processor in signal communication with a memory. The processor may be configured to execute a plurality of instructions of a control panel application stored in the memory and in response to an emergency event. Upon receiving an alert indicative of the emergency event, the processor, under the control of the control panel application, may be configured to identify one or more devices responsive to the emergency event. The fire control panel may also be configured to identify an audio file representative of an audio message corresponding to the emergency event, and to generate a log file in response to the emergency event. One or more values corresponding to the one or more devices may also be recorded in the log file as an entry. Additionally, the fire control panel, under the control of the control panel application, may be configured to embed the audio message into the log file via an embedding means.

In another embodiment, a method in a control panel for archiving an audio message corresponding to an emergency event is described. The method includes the step of receiving an alert identifying the emergency event. The method further includes the step of identifying one or more safety devices responsive to the emergency event and generating a log file in response to the event. One or more values corresponding to the one or more safety device may also be recorded in the log file as an entry or record. The method also includes the step of identifying an audio file representative of the audio message corresponding to the emergency event, and embedding, via an embedding means, the audio message into the log file.

In yet a further embodiment, a method in a data controller for archiving an audio message corresponding to an emergency event is described. The method includes the step of receiving, via a control panel operably connected to the data controller, a message in response to the emergency event, the message including a log file corresponding to the emergency event. The method further includes the step of determining whether the message identifies an audio file representative of the audio message. Upon identifying the audio file, the method further includes the step of updating the log file, via an embedding means, by embedding the audio message of the identified audio file in the log file.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 2B illustrates an exemplary embodiment of a screen capture of a user interface generated and managed by a control application of the control panel of FIG. 2A;

FIG. 4A illustrates an exemplary embodiment of a log file generated by a log file generator in accordance with the disclosure provided herein;

FIG. 4B illustrates a further exemplary embodiment of the log of FIG. 4A updated via the log file generator in accordance with the disclosure provided herein;

DETAILED DESCRIPTION

The components and materials described hereinafter as making up the various embodiments are intended to be illustrative and not restrictive. Many suitable components and materials that would perform the same or a similar function as the materials described herein are intended to be embraced within the scope of embodiments of the present invention.

In general, the computing systems and devices described herein may be assembled by a number of computing components and circuitry such as, for example, one or more processors (e.g., Intel®, AMD®, Samsung®) in communication with memory or other storage medium. The memory may be Random Access Memory (RAM), flashable or non-flashable Read Only Memory (ROM), hard disk drives, flash drives, or any other types of memory known to persons of ordinary skill in the art and having storing capabilities. The computing systems and devices may also utilize cloud computing technologies, via the internet, to facilitate several functions, e.g., storage capabilities, executing program instructions, etc., as described in further detail below. The computing systems and devices may further include one or more communication components such as, for example, one or more network interface cards (NIC) or circuitry having analogous functionality, one or more one way or multi-directional ports (e.g., bi-directional auxiliary port, universal serial bus (USB) port, etc.), in addition to other hardware and software necessary to implement wired communication with other devices. The communication components may further include wireless transmitters, a receiver (or an integrated transceiver) that may be coupled to broadcasting hardware of the sorts to implement wireless communication within the system, for example, an infrared transceiver, Bluetooth transceiver, or any other wireless communication know to persons of ordinary skill in the art and useful for facilitating the transfer of information. Additionally, a power supply/pack (e.g., hard wired, battery, etc.) may be included in any of the computing devices described herein. These power supplies may also include some form of redundancy or a backup power means known to persons of ordinary skill and for maintaining the functionality of the computing devices and/or components described herein.

Figure 1:
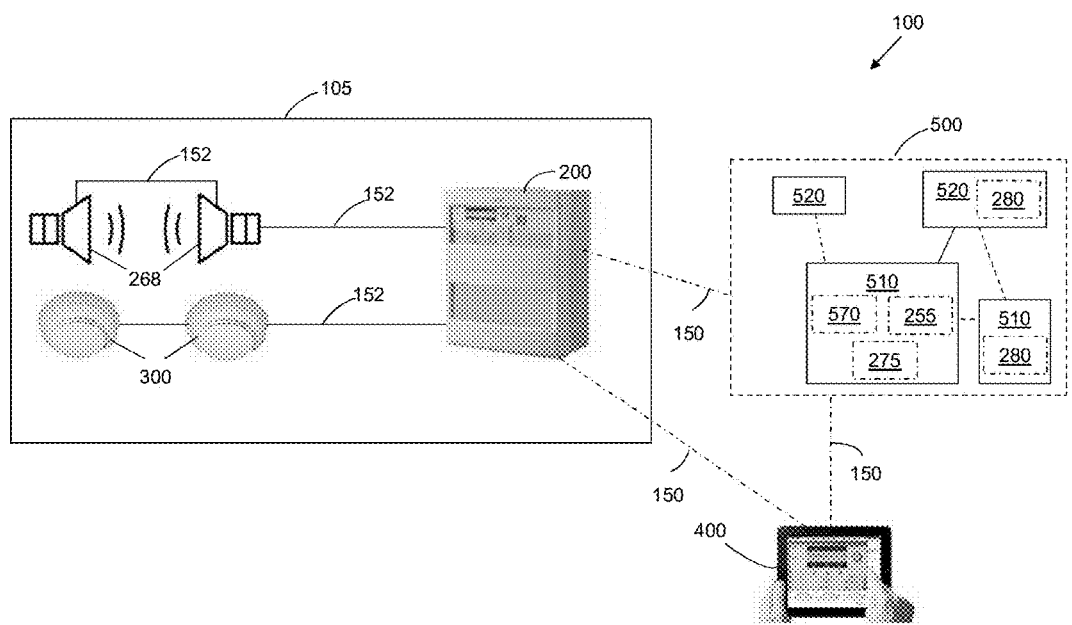
FIG. 1 illustrates an exemplary embodiment of an emergency notification system in accordance with the disclosure provided herein.

Referring now to the drawings wherein the showings are for purposes of illustrating embodiments of the subject matter herein only and not for limiting the same, FIG. 1 illustrates an embodiment of an emergency notification system 100, such as a fire alarm or safety system. The system 100 may include one or more control panels 200 operably connected to one or more safety field devices 300 (also referred to herein as an alarm device or a notification safety device), one or more mobile devices 400, and one or more data housing platforms (DHP) 500, e.g., cloud computing services.

In one exemplary embodiment, as illustrated in FIG. 1, the control panel 200, safety device 300, and mobile device 400 may be operably connected to each other within a defined area 105, e.g., a building or campus, via one or more electronically supervised audio paths or communications links 150, 152. The DHP 500 may also be operably connected to the control panel 200 and mobile device 400 via the electronically supervised audio paths or communications links, or may facilitate communication between multiple devices within the system 100, e.g., multiple control panels 200 via the communications link. The communications links may be, e.g., a wired communications link 152, wireless communications link 150, or any other communications link known to persons having ordinary skill in the art and configurable to allow for communication and/or interfacing between the devices and/or components of the system 100. Examples of such communication links may include Local Area Networks (LAN), Wide Area Networks (WAN), and Global Area Networks (GAN) having wired or wireless branches. Additionally, network devices/components and/or nodes (e.g., cabling, routers, switches, gateway, etc.) may also be included in the system 100 for facilitating the transfer of information within the system 100, and between at least the control panel 200, the one or more safety devices 300, the DHP 500, or any devices that may be external to the system 100.

Figures 2A, 2C:
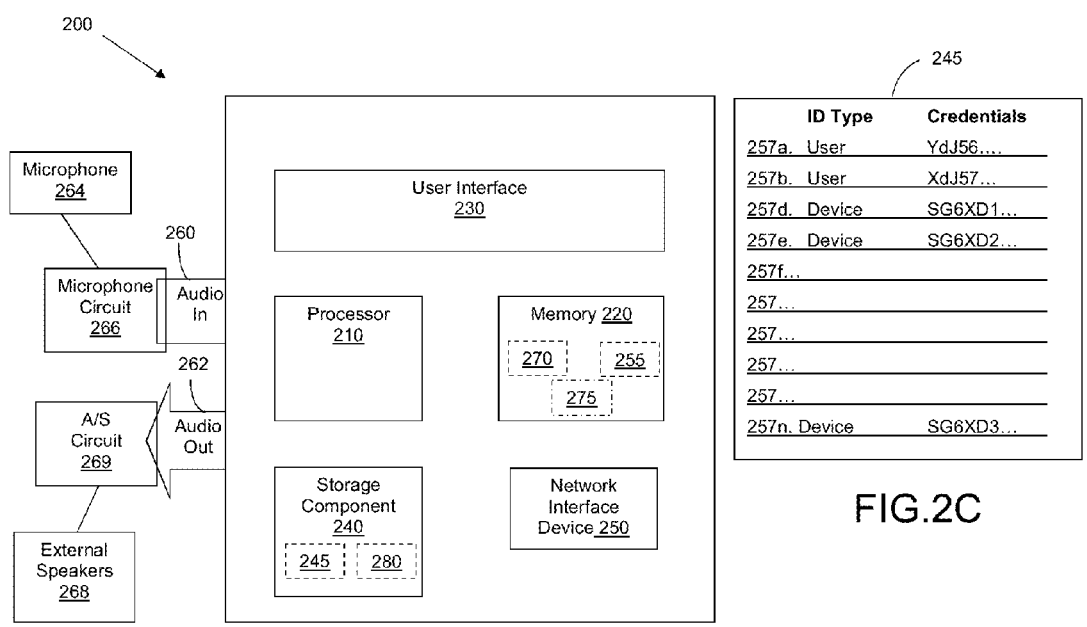
FIG. 2A illustrates an exemplary embodiment of a control panel that may be utilized in the system shown in FIG. 1, and in accordance with the disclosure provided herein.
FIG. 2C illustrates an exemplary embodiment of a listing identifying one or more devices or users authorized to the system shown in FIG. 1, and in accordance with the disclosure provided herein.

With reference to FIG. 2, the control panel 200 may be, e.g., a fire alarm control panel or fire and voice control panel (FACP) 200, and may include any combination of the components and/or circuitry described above for facilitating the transfer of information within the system 100. In the embodiment of FIG. 2A, the FACP 200 includes, at least, a processor 210 operably connected to a memory 220 for executing various instructions and/or commands of a control application ("CAP") 270, which may be stored in the memory 220. The FACP 200 may further include a user interface 230, storage component 240 (e.g., hard disk drive, solid-state drive etc.), and network interface device 250. The network interface device 250 may be any of the communication components (e.g., NIC, wireless transceivers etc.) described herein for facilitating the transfer of information between the FACP 200 and other devices within the system 100, via, e.g., the communication links described herein. The user interface 230 may comprise a display with a separate or integrated keyboard and/or stylus that enables the processor 210 to provide outputs to and receive inputs from a user when under the control of the CAP 270. In a further exemplary embodiment, the user interface 230 may comprise a touch screen display that may be controlled and managed by the CAP 270. The touch screen display may have dual functionality for providing both an input means for receiving commands upon depressing the touch screen in any capacity, and an output or displaying means for displaying the results of the received/executed commands of the CAP 270.

The FACP 200 may further include one or more microphones 264 operably connected thereto via an audio input 260, and one or more notification or broadcasting devices, e.g., speakers 268, operably connected thereto via an audio output 262. In one embodiment, the audio input 260 and output 262 may be a single component, i.e., a single port having input/output (I/O) capabilities. In one embodiment, the microphones 264 may be connected to the audio input 260 via a microphone interface circuit 266 operable to receive and/or convert audio signals from the microphone 264 or similar device configured for transmitting audio signals to the FACP 200. The microphone interface circuit 266 may include Analog-to-Digital convertors and other audio signal processing circuitry to convert an audio signal to a corresponding digital audio message for transmission to the FACP 200. The speakers 268 may also be connected to the audio output 262 via an amplifier and/or speaker interface circuit (A/S) 269 for facilitating the broadcasting of any audio from the FACP 200 or other devices, e.g., the mobile device 400. The amplifier and/or speaker interface circuit 266 may include Digital-to-Analog convertors and other audio signal processing circuitry to convert a digital audio message to a corresponding audio signal for broadcast via the speakers 268.

With continued reference to the figures, and now FIG. 2B, an exemplary screen capture 275 of the user interface 230 generated via the CAP 270 in accordance with disclosed embodiments is provided. The user interface 230 may be a graphical user interface (GUI) generated by the CAP 270.

The GUI may include one or more user selectable icons, which may be graphical symbols and/or include text (e.g., hyperlinks), corresponding to executable commands or instructions to be processed by the processor 210. The various commands may be activated and processed by the CAP 270 upon selection of the icons via the user interface 230. The user interface 230 may further include one or more fields (272) for displaying data from a database or other listing, e.g., having identification information corresponding to one or more devices within the system 100. In the embodiment of FIG. 2B, e.g., the fields 272 of the user interface 230 may include a FACP 200 serial number field 272a, a notification device serial number field 272b, a location field 272c for identifying the geographic coordinates for each device, a status field 272c for providing the status, e.g., active or inactive, for each device, an address field 272d that may identify the location of the device within the system 100, and a message field 272e that may provide information related to the occurrence of an emergency event.

Figure 3:
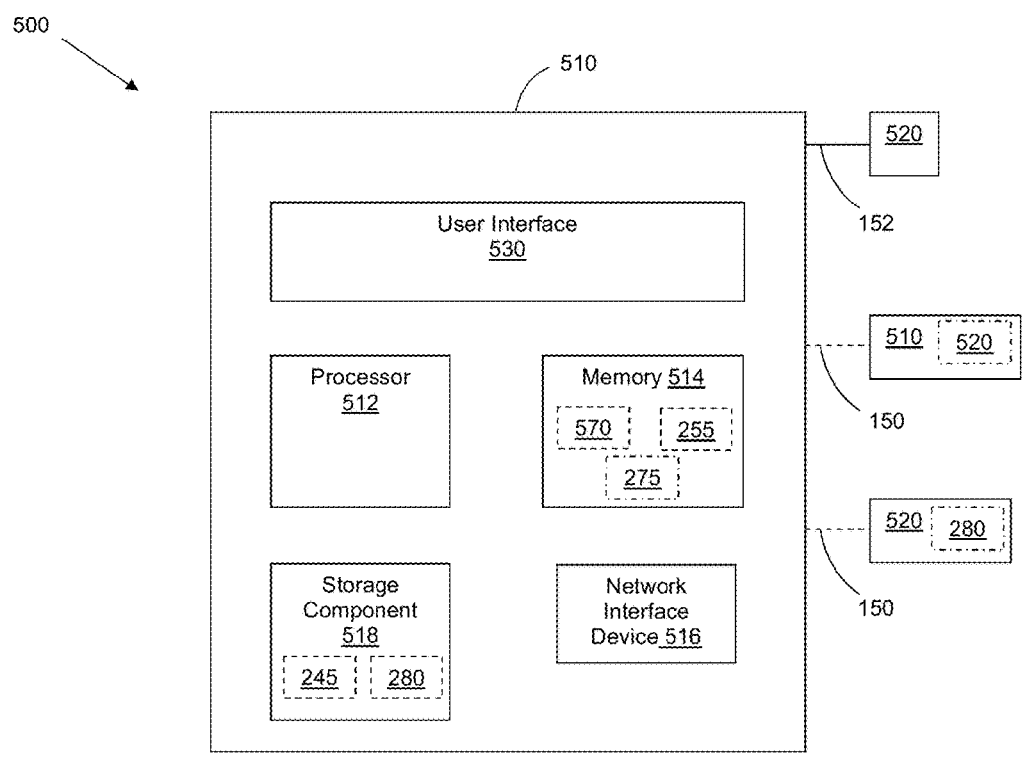
FIG. 3 illustrates an exemplary embodiment of a data housing platform having a data controller that may be utilized in the system shown in FIG. 1, and in accordance with the disclosure provided herein.

With continued reference to the figures, and now FIG. 3, the DHP 500 may include one or more data controllers 510 operably connected to one or more data storages 520 (FIG. 1). The data controller 510 and data storage 520 may be separate devices (e.g., servers) within the DHP 500, or alternatively, may be comprised on a single device within the DHP 500. The data controller 510 and data storage 520 may each include any combination of the components and/or circuitry described above for facilitating the transfer of information between, e.g., the data controller 510, the data storage 520, the FACP 200, or other devices within the system 100. The data storage 520 may be operably configured for storing any system data, including, e.g., data related to the events that may have occurred within the system 100. That is, the data storage 520 may effectively provide the space necessary to archive any data related to the events, including the log files with corresponding audio files.

As illustrated in the exemplary embodiment of FIG. 3, the data controller 510 may include at least a processor 512 operably connected to a memory 514 for executing one or more instructions or commands of a data controller application (DCA) 570 stored in the memory 514. The data controller 510 may further include a user interface 530. The user interface 530 may be similar to the user interface 230 in that it may be any general interface for receiving user input and generating a displayable output on a display (not shown). The data controller 510 may also include a network interface device 516 for facilitating the transfer of information between the data controller 510 and other devices within the system 100, e.g., FACP 200 or mobile device 400, and a data storage component 518 for providing a storage medium for one or more files.

In yet a further exemplary embodiment, the data controller 510 may include a proxy or gateway application (GA) 255 stored in the memory 514 and operable to establish a connection between the data controller 510 and other devices within the system 100, e.g., the FACP 200, mobile device 400, or other server of the DHP 500 via the network interface device 516. The GA 255, in general, may be, e.g., a proxy or SSH tunnel with socket connectivity configured to establish a connection. The GA 255 may be its own application executed by the processor 512, or in a yet further embodiment, a series of instructions part of the DCA 570. In accordance with the disclosed embodiments, it may be advantage to provide access and retrieval of the log file 280 to facility administrators or emergency event responders, e.g., by a mobile device 400 coupled to the data controller 510 via the GA 255, who may need to know what audio messages were communicated to persons in area or zones of the building where the emergency event was detected. In order to establish a connection, the GA 255 may be operably configured to authenticate one or more user credentials (257a-257n) and/or verify system device information via a database or listing 245 (FIG. 2C).

In one embodiment, the listing 245 may be included in the GA 255, or in a further embodiment, requested or retrieved from in the data controller 510, e.g., via the storage 518 or memory 514. The listing 245 may include, for example, a list of devices or users authorized or registered with the FACP 200 for communicating with the FACP 200 via the GA 255, or for communicating with one or more servers of the DHP 500 via the GA 255 of the DHP 500 or FACP 200. Additionally, each entry of the listing 245 may include information corresponding to the fields 272 of the user interface 230 (as depicted in FIG. 2B, for example) managed by the CAP 270. During the authentication operation, for example, the processor 512 of the data controller 510, when under the control of the GA 255, may receive an authentication request from one or more of the system devices, e.g., FACP 200 over the communication link 150 (e.g., the internet) for establishing a connection with the data controller 510. The GA 255 (alone or in cooperation with the DCA 570) may access the listing 245 to verify that the requesting device is authorized and/or registered to connect to the data controller 510 before providing an acknowledgment message to the requesting device indicating or confirming that the connection is established to facilitate the transmission of data between the data controller 510 and the requesting device, e.g., FACP 200.

In yet a further embodiment, the GA 255 may be part of the FACP 200 instead of the DHP 500. That is, the GA 255 described herein may be a series of instruction of the CAP 270, or its own instructions residing in the memory of one of the FACP 200 for authenticating user credentials and/or verify system device information. In this embodiment, the connection between the FACP 200 and other system devices, e.g., the DHP 500, mobile device 400, or additional FACP 200, may be established by verifying the credentials with, e.g., an embodiment of the listing 245 stored in e.g., the storage component 240 of the FACP 200, or other storage medium operably connected to the FACP 200.

With continued reference to the figures, and now FIG. 4, the FACP 200 may further include a means for generating a log file 275 stored in the memory 220 and in operable communication with the CAP 270. In one exemplary embodiment, the means for generating a log file 275 may be, e.g., a log file generator 275 comprising executable instructions for creating or updating a log file 280 (also referred to herein as log), and for recording system data corresponding to an event occurrence in the log file 280. The system data recorded to the log file 280 may include, e.g., data related to the devices within the system 100, like those corresponding to the field 272 descriptions, in addition to device interactions during an event. In one embodiment, the log file generator 275 may be a series of instructions of the CAP 270 for generating a log file, or in a further embodiment, its own application, series of instructions, or stand alone component configured to generate and/or update the log file 280. It should also be appreciated, e.g., in yet a further embodiment, that the log file generator 275 may be a series of instructions of the other device applications, e.g., the DCA 570.

In an exemplary embodiment, upon the occurrence of an emergency event, the FACP 200, under the control of the log file generator 275, may create a first instance of the log file 280, i.e., an initial log file 280, within the FACP 200 in response to the event occurrence, i.e., upon detecting or receiving an alert identifying an emergency event. The log file 280 may be any file type that is compatible with the devices within the system 100 (e.g., the FACP 200, data controller 510, mobile device 400), and capable of having one or more objects, e.g., media files, embedded therein. That is, the file type supports object linking and embedding (OLE) technologies or the like.

The FACP 200, via embodiments of the log file generator 275 or CAP 270, may also be configured to identify any devices activated or designated to activate in response to the emergency event, e.g., the notification device 300, FACP 200, and the device interactions with one another throughout the event occurrence. Once the devices and their interactions have been identified, the log file generator 275 may record the data corresponding to the identified devices or events to the log file 280. The recorded data may be provided in the log file 280 as one or more entries or records 285 (FIG. 4). As shown in FIG. 4, each record 285 may provide data (or values) that correspond to or represents a particular emergency event, e.g., the event date 284 or activated control panel ID 272*a*. The record 285 may further include other information particular to the log file 280, e.g., a log file ID 281 or other unique identifier. Additionally, the record 285 may include data representative of the FACP's 200 interactions with the other devices in response to the emergency event, e.g., data indicating which device detected the condition 272*b* (e.g., smoke), which resulted in the emergency event, and data indicating the devices activated 272*b* as a result of the detected condition. Upon recording the data in the log file 280, the FACP 200, under the control of the log file generator 275 or CAP 270, may save the log file 280 to, e.g., the memory 220, storage 240, or other device operably connected to the FACP 200, e.g., the data controller 510 or data storage 520, or second FACP 200.

In yet a further exemplary embodiment, an audio file comprised of a pre-recorded or live audio message may also be created or provided in response to the emergency event. The pre-recorded message may be provided by the FACP 200, or by another device operably connected to the FACP 200, e.g., the mobile device 400, data controller 510 or data storage 520. The live audio message may result from one or more audio signals received via a microphone 264 operably connected to the FACP 200, or other microphone operably connected to another device of the system 100, e.g., mobile device 400. The received audio signals may be processed by a microphone circuit 266, and broadcasted as an audio message via one or more annunciators/speakers 268 operably connected to the FACP 200. The broadcasted audio message may then be saved as an audio file to a memory or storage of one of the devices in the system, e.g., the FACP 200, data controller 510, or data storage 520.

With continued reference to the figures, once the audio file is created and/or provided, the FACP 200, under the control of log file generator 275, may update the log file 280 to include the audio message broadcasted in response to the event. To embed the audio message, the FACP 200 may include an embedding means or means for embedding media in its memory 220. The embedding means may comprise of a series of executable instructions for creating or integrating (i.e., embedding) one or more media files into the log file 280. The series of instructions for embedding may be a series of instructions as part of, e.g., the CAP 270, log file generator 275, or both, or in a further embodiment, its own application, series of instructions, or stand alone component configured to update the log file 280 by embedding media, e.g., the audio message, therein. In yet a further embodiment, the embedding means may be an audio processing circuit configured to receive audio signals and convert them into a format capable of being embedded in the log file 280.

As described herein, and for exemplary purposes and not for limiting the same, the various embodiments of the embedding means will now be described as being a series of instructions as part of the log file generator 275. However, for the sake of brevity, it should be appreciated that the embodiments described herein for the embedding means may be applicable to any embodiment of the embedding means.

To embed the audio message into the log file 280, e.g., the log file generator 275 (as the embedding means) may begin by accessing or opening the log file 280, if the log file 280 is not already opened. The log file generator 275 may then proceed to parse or examine one or more values of the log file 280 to determine whether the audio message to be embedded corresponds to the event identified in the log file 280. To determine whether or not a log file 280 corresponds to a specific event, the log file generator 275 may include instructions executable to identify event data, e.g., event date and/or time, devices activated, etc., or other particulars specific to the event. Upon determining that the audio message corresponds to the event represented in the log file 280, the FACP 200, under the control of the log file generator 275, may begin the embedding process by extracting the data representing the audio message from the audio file. It should be appreciated that the process of extracting the data may include the step of accessing the audio file from a local or remote directory. Next, the extracted data may be integrated into the log file 280, e.g., in the metadata, in the extracted format, or in a further embodiment, the data may be converted from the extracted format into format compatible for being embedded into the log file 280. In yet a further embodiment, the embedding process may include the step of saving the data representing the audio message as a temporary file, e.g., a WAV file, extracting the data from the temporary file, and then integrating this data into the log file 280, e.g., as text or an object, via the log file generator 275. In this embodiment, to embed the data as text, the log file generator 275 may further include a speech-to-text convertor (not shown). Thereafter, the embedded audio message may be provided or presented in the log file 280 or as part of the record 285 (FIG. 4) as an audio indicia 290.

Upon embedding the broadcasted audio message into the log file 280, the FACP 200 may archive the log file 280 with embedded audio message by saving the log file 280 to the data storage 520, or any other storage medium operably connected to the FACP 200 and capable of having the log file 280 stored thereon or saved thereto, e.g., memory 220, 514 or storage 240, 518. It should also be appreciated, that the log file generator 275, or other application, e.g., CAP 270, DCA 570, may include a series of executable instructions to compress and/or manipulate the log file 280, or any other file, e.g., the audio file, into a format different from its original format to facilitate or improve the transmission of the file through the system 100, e.g., from data controller 510 or storage 520 to FACP 200 or mobile device 400. The application may also include instructions to restore or convert the files back to its original format, e.g., joining or extracting the files upon the file reaching its destination.

In yet a further exemplary embodiment, the log file generator 275 may be configured to update other information in the log file 280 by, e.g., adding, removing, or changing one or more values of the records 285. An example of a log file 280 updated by the log file generator 275 can be seen in FIGS. 4A-B, where the unknown device in record 3 of FIG. 4A is updated to Safety Device ID: SD234KZ3 in record 3 of FIG. 4B. An example of a new record 285 created in the log file 280 can also be seen in FIGS. 4A-B, where new record 4 (FIG. 4B) is now included in the log file 280. The updating functionality may prove useful where it is desired to retroactively update log files 280 with additional information corresponding to an event identified therein, or for embedding additional media corresponding to the event.

It should be appreciated that the embodiments of the log file generator 275 e.g., for embedding and updating the log file 280, may be performed on one of the DHP 500 servers, e.g., data controller 510, instead of the FACP 200. That is, the log file generator 275 described herein may be a series of instruction of the DCA 570, or its own instructions residing in the memory of one of the data controllers 510 for generating or updating a log file corresponding to a emergency event.

In yet a further embodiment, a timestamp 284 field may be provided in the log file 280. The timestamp field 284 may include a value representing the time of the emergency event or, e.g., the time the log file 280 was created and/or updated. In one exemplary embodiment, the time stamp 284 value may be manually provided, e.g., entered by an operator. In a further embodiment, the time stamp 284 value may be determined via any embodiment of the applications described herein, e.g., the log file generator 275, CAP 270, DCA 570. For example, the log file generator 275 may include executable instructions for generating the value based on data received from a system clock of the device where the log file generator 275 resides, e.g., the FACP 200, or a system clock of another system 100 device responsive to the emergency event, e.g., a second FACP 200 or data controller 510, and accessible by the processor under the control of the log file generator 275, e.g., when the respective detected emergency event is received from the safety field device 300.

Figure 5:
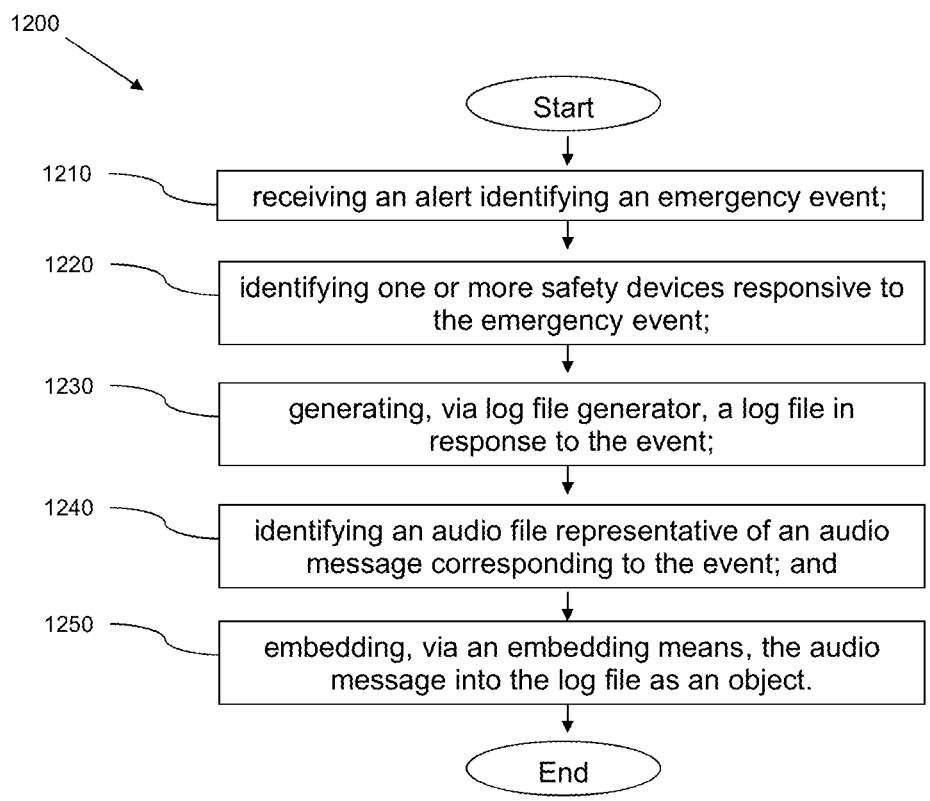
FIG. 5 illustrates an exemplary flowchart of a process performed by the fire control panel of FIG. 2 in accordance with the disclosure provided herein.

With reference now to FIG. 5, an exemplary flowchart of a process 1200 performed in the FACP 200 (for example, by the processor 210 of the FACP 200, under the control of an embodiment of the CAP 270 as disclosed herein) for archiving the log file 280 with one or more embedded audio messages associated with an emergency event. Upon the occurrence of an emergency event, e.g., smoke or fire present in a building, the safety field device 300 detects the event and may generate an alarm signal or alert indicative of the occurrence. The alert may include, among other things, the address and location of the safety field device 300, the time when the safety field device 300 was activated, and the type of conditions being detected. In one embodiment, the emergency event may be the alert (e.g., alarm signal received from the respective safety field device 300). Alternatively, the emergency event may be pre-defined message assigned to any alert received from a respective safety field device 300 (e.g., fire detected in room corresponding to the location of safety field device 300 that transmitted the alert to the FACP 200).

In the process 1200 depicted in FIG. 5, the FACP 200 receives an alert identifying an emergency event from the safety field device 300 via a communication link 150 between the FACP 200 and the respective safety field device 300 (1210). Upon receiving the alert, the FACP 200 identifies one or more safety devices responsive to the emergency event (1220). The FACP 200 may identify the one or more safety devices by first determining, e.g., by parsing the alert, whether the alert identifies any devices, e.g., the safety field devices 300, responsive to the emergency event. In this step, the FACP 200 may also identify the device interactions with one another in response to the event. Upon identifying the devices and/or their interactions in response to the event, the FACP 200, under the control of the CAP 270, or log file generator 275, may generate the log file 280, and record any identified values to the log file 280 as an entry or record 285 (1230). Upon recording the values, the FACP 270, may next save the log file 280 to the memory 220 or other storage medium or device, e.g., data controller 510, for later retrieval of the log file 280.

In an embodiment where the log file 280 is saved to a different device, e.g., the data controller 510, a connection between the FACP 200 and data controller 510 may be established via the GA 255 stored in the memory of one of the system devices, e.g., memory 220, 250. In this embodiment, a message (authentication request) from a requesting device, e.g., second FACP 200 or data controller 510, may be received via the GA 255 to establish a connection with the FACP 200. This authentication request may include one or more credentials for establishing the connection. The GA 255 may verify that the requesting is authorized to establish a connection by comparing the credentials against, e.g., the listing 245 (FIG. 2C). If a connection between the devices is not authorized, the device receiving the request, under the control of the GA 255, may transmit a reply message indicating that the connection cannot be establish. If the connection is authorized, the GA 255 may transmit a reply message indicating that the connection is established, or provide some indication that the connection is established, e.g., a timer reflecting the duration of the connection. Upon establishing the connection, the log file 280 may be transmitted, e.g., to the data controller 510 from the FACP 200, itself, or in a further embodiment, as part of a transmittal message or any subsequent message, e.g., as an enclosure or attachment.

With continued reference to the process depicted in FIG. 5, the FACP 200 may identify an audio file comprised of an audio message corresponding to the emergency event (1240). The identified audio file may be representative of a live audio message in response to the event, or a pre-recorded audio message corresponding to the event. The audio file may be identified as being stored in the memory 220 or storage 240 of the FACP 200, or alternatively, another storage medium or device, e.g., the data controller 510 or data storage 520. In one exemplary embodiment, to identify the audio file, the FACP 200 may record one or more values in the log file 280, e.g., the record 285, indicating the location or directory where the audio file may be found, e.g., a directory in the data storage 520. The FACP 200 may also identify the audio file by including the audio file in the generated transmittal message, e.g., as an attached or enclosed file, separate from attached or enclosed the log file 280. To differentiate between the types of files that may be included with the transmittal message, the FACP 200 may provided each file using a distinct naming convention or file type, e.g., WAV, MP3, DSS, particular to audio files.

In yet a further embodiment, the audio file may be identified, via the FACP 200, based on the event time or time the log file 280 was generated. In this embodiment, e.g., to identify the audio files or signals based on time, the FACP 200, under the control of any of the embodiment of the CAP 270, log file generator 275, or embedding means, may be utilize a timing mechanism, e.g., a device system clock or other timer, to establish a period of time for the FACP 200 to listen for audio signals or parsing through data to identify the audio broadcasted in response to the event or corresponding to the event. For example, upon receiving an event alert from the notification device 300, or upon generating the log file 280, the processor 210 or other audio processing circuit of the FACP 200, or other device as described herein and under the control of the CAP 270 or other application, may begin listening or parsing through any files and messages detected or received via the FACP 200 after the alert and for a time period defined by the timer. The time period may be a predetermined period, e.g., 12, 24, or 48 hours following the event time established, e.g., by the system clock or a manual entry, or in a further embodiment, the time period may be undefined. In an embodiment where the time period is not defined, the timer may be configured to cause the above circuitry to listen for audio over set time increments, i.e., every fraction of an hour to an hour, until a file is identified. Upon identifying the audio, the listening or search function may cease so that the embedding process may continue. It should also be appreciated, that the start time for utilized with the timer functionality may be the same time represented in the timestamp field 284. It should also be appreciated that while non-media files may also be received following the alert, the FACP 200 may be configured to identify any audio based on the above timing functionality and the naming conventions or file types identifiers that may be unique to audio files.

With continued reference to the process depicted in FIG. 5, upon identifying the audio message, the FACP 200, under the control of an embodiment the CAP 270 or log file generator 275, may begin the process for embedding the audio message into the log file 280 (1250). To embed the audio message, the FACP 200, may first access or open the log file 280, if the log file 280 is not already accessed. Next, the FACP 200 may begin parsing through various data in the log file 280 to determine whether the identified audio message corresponds to the event represented in the log file 280. For example, the FACP 200 may the compare the time the audio was received, e.g., the period defined by the timer, with e.g., the value represented in the timestamp field 284 to determine if the audio was received with the period established via the timer. Upon determining that the audio message corresponds to the event represented in the log file 280, the FACP 200 may begin integrating the data comprised in the audio message into the metadata of log file 280, e.g., such that data representative of the audio message is present in the log file 280 metadata. Once the audio message is embedded into the metadata, the embedded audio message (i.e., the object) may be provided or represented in the log file 280 as audio indicia 290, e.g., a symbol, icon, selectable icon or hyperlink (FIG. 4). Providing the object as indicia may provide an indication to a user accessing the log file 280 that the log file 280 includes the audio message corresponding to the emergency event as an embedded object.

Upon updating the log file 280 by embedding the audio message broadcasted in response to the event, the FACP 200, under the control of the CAP 270, may proceed to archive the log file 280 with embedded audio message by saving the log file 280 to the data storage 520, e.g., or any other storage medium operably connected to the FACP 200, e.g., the memory 220, or storage 518, and capable of having the log file 280 stored thereon or saved thereto. In yet a further embodiment, where additional data corresponding to the emergency event (e.g., new or updated data) is received via the FACP 200, the FACP 200, under the control of the log file generator 275, may be configured to update the log file 280 with the additional data via any of the above processes, e.g., process 1230, 1250.

Figure 6:
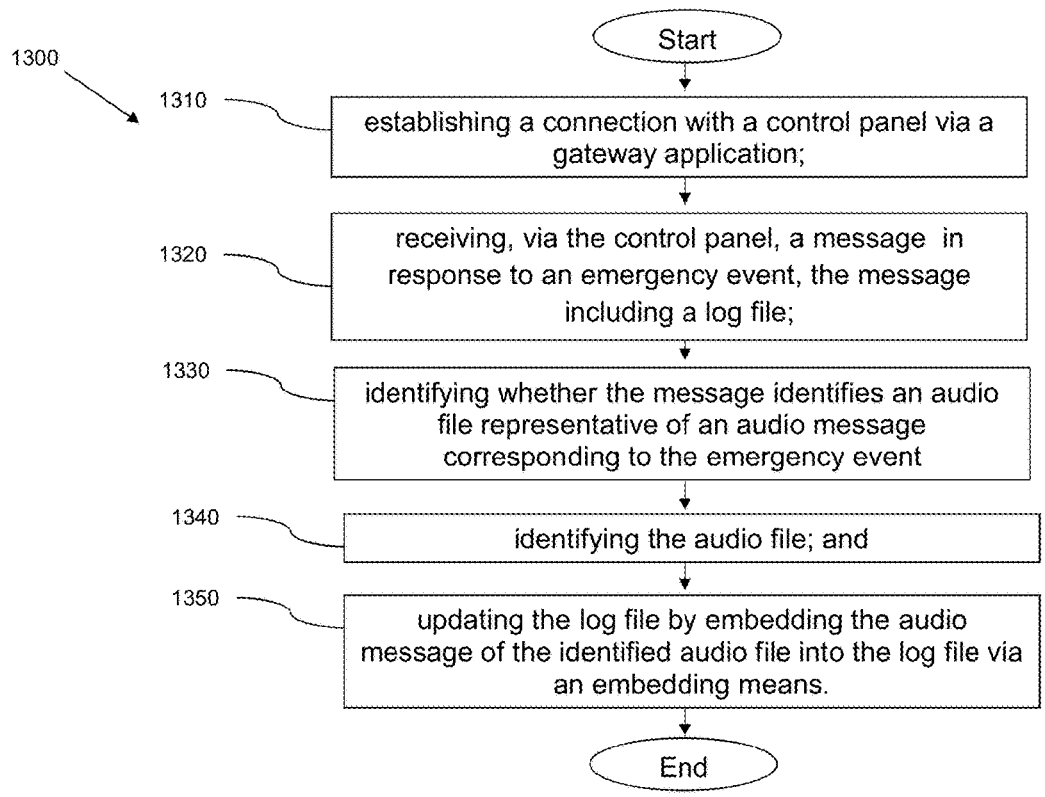
FIG. 6 illustrates an exemplary flowchart of a process performed by the data controller of FIG. 3, and in accordance with the disclosure provided herein.

With reference now to FIG. 6, an exemplary flowchart of a process 1300 performed in the DCA 570 (for example, by the processor 512 of the data controller 510 in accordance with the embodiments of the DCA 570 as described herein) for archiving the log file 280 with embedded audio message. As previously described herein, upon the occurrence of an emergency event, the FACP 200, under the control of the CAP 270, may receive an alert identifying an emergency event from one or more of the safety field devices 300. In response to the emergency event, the processor 210 of the FACP 200, under the control of the CAP 270 or log file generator 275, may generate a log file 280 or message comprising the log file 280 to record any data corresponding to the emergency event. The generated message or log file 280 may include, e.g., identification information for one or more devices responsive to the emergency event, and the device interactions during or about the event time. After generating the log file 280, a connection between the FACP 200 and the data controller 510 may be established, e.g., for transmitting the message, the log file 280, or any other files corresponding to the emergency event (1310). In one embodiment, the connection may be established via the GA 255 residing in the memory of one of the FACP 200 or data controller 510, and in accordance with the embodiments described herein for establishing a connection between the devices via the GA 255.

Upon establishing the connection, the data controller may receive, via the FACP 200, the log file 280 or the transmittal message comprising the log file 280 (1320). In one embodiment, where the message comprising the log file 280 is provided via the FACP 200, the processor 510 of the data controller 510, under the control of the DCA 570, may be configured to parse the message to determine whether the message identifies or includes the log file 280. Upon identifying the log file 280, the data controller 510, may also be configured to identify whether the message also identifies an audio file representative of an audio message corresponding to the emergency event (1330). To identify the audio file, in one embodiment, the data controller 510, under the control of the DCA 570, may continue to parse the message for one or more identifiers indicative of audio file being included in the message, e.g., an audio ID, or specific file type (WAV, MP3). In yet a further embodiment where the log file 280 is provided instead of the message comprising the log file 280, the data controller 510 may be configured to parse the log file 280 to determine whether the log file 280 includes one or more values for identifying the corresponding audio file or audio message.

With continued reference to the process depicted in FIG. 6, after parsing the message or log file 280, the location of the audio file may be identified (1340). In one embodiment, the identified audio file may be included with the message, e.g., as file separate from the log file 280. In yet a further embodiment, the message may simply specify the location of the audio file so that the data controller 510 may retrieve the audio file from that location. For example, the identified audio file may be on the data controller 510, the data storage 520, or other device or storage medium as described herein. Upon identifying and accessing the audio the audio file, the data controller, under the control of the DCA 570, log file generator 275, or other embedding means as described herein, may begin the embedding process to update the log file 280 (1350).

In one embodiment, to embed the audio message, the data controller 510, under the control of the log file generator 275, may access the log file 280 if not already accessed. The log file generator 275 may then parse the log file 280 to determine whether the identified audio message corresponds to the event represented in the log file 280. Upon determine that the audio message corresponds to the event represented in the log file 280, the data comprised in the audio message may be integrated (i.e., embedded) into the log file 280 metadata, e.g., as an object. Additionally, the embedded audio message (i.e., the object) may be provided or represented in the log file 280 as audio indicia, e.g., a symbol, icon, selectable icon or hyperlink. Upon updating the log file 280 by embedding the audio message, the log file 280 may be archived by saving the log file 280 with audio message embedded therein to the storage 518 of the data controller 512, the data storage 520, or other storage medium as described herein, and configured for storing the log file 280 thereon or saving the log file 280 thereto.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the terms "comprising", "including", and "having", are open-ended and does not exclude other elements or steps and the use of articles "a" or "an" does not exclude a plurality. Additionally, the steps of various methods disclosed herein are not required to be performed in the particular order recited, unless otherwise expressly stated.

We claim:

1. A fire control panel with archiving capabilities, comprising:
   a processor in signal communication with a memory and configured to execute a plurality of instructions of a control panel application stored in the memory and in response to an emergency event, the plurality of instructions including monitoring and managing safety field devices comprising fire and smoke detectors;
   wherein upon receiving an alert indicative of the emergency event, the processor, under the control of the control panel application, is configured to:
      identify one or more safety field devices responsive to the emergency event;
      identify an audio file representative of an audio message corresponding to the emergency event and broadcasted via a speaker,
      generate a log file in response to the emergency event, and record one or more values corresponding to the one or more safety field devices as an entry in the log file, the one or more values comprising an emergency event date and data indicating activated safety field devices; and
      embed the audio message into the log file via an embedding means,
      wherein the embedding means is a log file generator residing in the memory of the fire control panel, and wherein embedding comprises, under control of the log file generator, extracting data representing the audio message from the audio file and integrating extracted data into metadata of the log file and converting data from the extracted format into a format compatible for being embedded into the log file, and
   further comprising a timer operably coupled to the processor, the timer defining a time period for identifying the audio file,
   wherein the processor, under the control of the control panel application, identifies the audio file based on an audio files presence within the defined time period.

2. The fire control panel of claim 1,
   wherein the processor, under the control of the control application, is further configured to:
      establish a connection with a data controller operably connected to the fire control panel; and
      transmit the log file to the data controller.

3. The fire control panel of claim 2,
   wherein the embedding means is a log file generator residing in a memory of the data controller;
   wherein the identified audio file is on the data controller; and
   wherein the audio message is embedded on the data controller.

4. The fire control panel of claim 2,
   wherein the connection to the data controller is established via a gateway application residing in one of the memory of the fire control panel or a memory of the data controller.

5. The fire control panel of claim 1,
   wherein the audio message is embedded as an object, and wherein the object is represented by audio indicia in the log file.

6. The fire control panel of claim 5,
   wherein the audio indicia are included in the entry.

7. A system for archiving an audio message corresponding to an emergency event, comprising:
   a fire control panel in communication with one or more safety devices comprising fire and smoke detectors; and
   a data controller operably coupled to the fire control panel;
   wherein the fire control panel is configured to execute a method comprising:
      receiving an alert identifying the emergency event;
      identifying one or more safety devices responsive to the emergency event;
      generating a log file in response to the event, and recording one or more values corresponding to the one or more safety device in the log file as an entry, the one or more values comprising an emergency event date and data indicating activated safety field devices;
      identifying an audio file representative of the audio message corresponding to the emergency event and broadcasted via a speaker; and
      embedding, via an embedding means, the audio message into the log file,
      wherein the embedding means is a log file generator residing in the memory of the fire control panel, and wherein embedding comprises, under control of the log file generator, extracting data representing the audio message from the audio file and integrating extracted data into metadata of the log file and converting data from the extracted format into a format compatible for being embedded into the log file, and
   further comprising a timer defining a time period for identifying the audio file,
   wherein the method executed by the fire control panel further comprises identifying the audio file based on an audio files presence within the defined time period.

8. The system of claim 7,
   wherein the embedding step further comprises:
      establishing a connection with the data controller operably connected to the control panel; and
      transmitting the log file to the data controller.

9. The system of claim 8,
wherein the identified audio file is on the data controller, and wherein the audio message is embedded, via the embedding means, on the data controller.

10. The system of claim 9,
wherein the embedding means is a log file generator residing in a memory of the data controller.

11. The system of claim 8,
wherein the connection to the data controller is established via a gateway application residing in a memory of the control panel or the data controller.

12. The system of claim 7,
wherein the audio message is embedded as an object, and wherein the object is represented by audio indicia in the log file.

13. The system of claim 7,
wherein the data controller is configured to execute a method comprising:
  receiving, via the fire control panel, a message in response to the emergency event, the message including a log file corresponding to the emergency event;
  determining whether the message identifies an audio file representative of the audio message;
  identifying the audio file; and
  updating the log file, via an embedding means, by embedding the audio message of the identified audio file in the log file.

14. The system of claim 13,
wherein the receiving step further comprises:
  establishing a connection with the fire control panel, via a gateway application residing in a memory of the fire control panel.

15. The system of claim 13,
wherein the embedding means is a log file generator residing in a memory of the data controller;
wherein the identified audio file is on the data controller; and
wherein the audio message is embedded on the data controller.

16. The system of claim 13,
wherein the audio message is embedded as an object.

17. The system of claim 13,
wherein the audio message is represented by audio indicia in the log file.

* * * * *